(12) United States Patent
Sahay et al.

(10) Patent No.: US 11,663,546 B2
(45) Date of Patent: May 30, 2023

(54) AUTOMATED EVALUATION OF REFINERY AND PETROCHEMICAL FEEDSTOCKS USING A COMBINATION OF HISTORICAL MARKET PRICES, MACHINE LEARNING, AND ALGEBRAIC PLANNING MODEL INFORMATION

(71) Applicant: AspenTech Corporation, Bedford, MA (US)

(72) Inventors: Nihar Sahay, Houston, TX (US); Raja Selvakumar, Houston, TX (US); Dimitrios Varvarezos, Houston, TX (US)

(73) Assignee: AspenTech Corporation, Bedford, MA (US)

( * ) Notice: Subject to any disclaimer, the term of this patent is extended or adjusted under 35 U.S.C. 154(b) by 0 days.

(21) Appl. No.: 16/855,668

(22) Filed: Apr. 22, 2020

(65) Prior Publication Data

US 2021/0334726 A1   Oct. 28, 2021

(51) Int. Cl.
*G06Q 10/06* (2023.01)
*G06Q 10/0637* (2023.01)
(Continued)

(52) U.S. Cl.
CPC ......... *G06Q 10/06375* (2013.01); *G06N 5/04* (2013.01); *G06N 20/00* (2019.01);
(Continued)

(58) Field of Classification Search
None
See application file for complete search history.

(56) References Cited

U.S. PATENT DOCUMENTS 7,949,624 B2   5/2011  Kelly et al.
10,755,214 B2  8/2020  Apap et al.
(Continued)

FOREIGN PATENT DOCUMENTS

JP   2002024496 A   1/2002
JP   2004102890 A   4/2004
(Continued)

OTHER PUBLICATIONS

Decost et al. (Computer Vision and Machine Learning for Autonomous Characterization of AM Powder Feedstocks, JOM 69, 456-465 (2017), https://doi.org/10.1007/s11837-016-2226-1 , Published Dec. 27, 2016).*

(Continued)

*Primary Examiner* — Matthew D Henry
(74) *Attorney, Agent, or Firm* — Hamilton, Brook, Smith & Reynolds, P.C.

(57) ABSTRACT

Computer tool determines target feedstock for a refinery, process complex, or plant. The tool receives a dataset of market conditions and preprocesses the data based on properties of the plant. Using the preprocessed data and machine learning, the tool trains predictive models. Each predictive model calculates a breakeven value of a candidate feedstock for the given plant under an individual market condition. Different predictive models optimize for different market conditions. A trained predictive model is selected based on a current market condition. The tool applies the selected predictive model and determines whether a candidate feedstock is a target feedstock for the refinery under the current market condition.

7 Claims, 9 Drawing Sheets
(2 of 9 Drawing Sheet(s) Filed in Color)

(51) Int. Cl.
G06N 20/00 (2019.01)
G06N 5/04 (2023.01)
G06Q 10/0631 (2023.01)
G06Q 10/067 (2023.01)
G06Q 30/0201 (2023.01)
G06Q 50/06 (2012.01)

(52) U.S. Cl.
CPC ..... *G06Q 10/067* (2013.01); *G06Q 10/06315* (2013.01); *G06Q 30/0206* (2013.01); *G06Q 50/06* (2013.01)

(56) References Cited

U.S. PATENT DOCUMENTS

| | | | |
|---|---|---|---|
| 2003/0139993 | A1 | 7/2003 | Feuerverger |
| 2003/0139994 | A1 | 7/2003 | Jones |
| 2005/0050009 | A1 | 3/2005 | Gardner et al. |
| 2005/0050010 | A1 | 3/2005 | Linden |
| 2005/0097027 | A1 | 5/2005 | Kavanaugh |
| 2006/0184254 | A1 | 8/2006 | Carpency |
| 2010/0332273 | A1 | 12/2010 | Balasubramanian et al. |
| 2012/0254092 | A1 | 10/2012 | Malov |
| 2016/0260041 | A1* | 9/2016 | Horn ................ G06Q 50/04 |
| 2016/0320768 | A1* | 11/2016 | Zhao ................ G05B 23/0281 |
| 2017/0308831 | A1* | 10/2017 | Apap ................ G06N 7/005 |
| 2018/0314977 | A1 | 11/2018 | Jiang et al. |

FOREIGN PATENT DOCUMENTS

| | | |
|---|---|---|
| JP | 2019516183 A | 6/2019 |
| JP | 6920345 | 7/2021 |
| WO | 2002/021401 A2 | 3/2002 |
| WO | 2017/184306 A1 | 10/2017 |
| WO | 2021216166 | 10/2021 |

OTHER PUBLICATIONS

Aspen Technology Corp. (2007). PIMS User's manual, v.16. Houston.

Calfa, B.A., et al. "Data-driven individual and joint change-constrained optimization via kernel smoothing"; Computers & Chemical Engineering, 78: 51-69 (2015).

Charnes, A., et al. "Chance-Constrained Programming"; Management Science, 6 (1), 73-79, Oct. 1959.

Clustering. Retrieved from scikit-learn: Oct. 10, 2019 https://scikit-learn.org/stable/modules/clustering.html#k-means.

Cretien, P.D., "Trading option break-even prices",www.futuresmag.com/2011/08/31/trading-option-beak-even-prices. Retrieved from Internet Jan. 18, 2016.

Grossman, I.E., et al. "Generalized Disjunctive Programming: A Framework for Formulation and Alternative Algorithms for MINLP Optimization" Mixed Integer Nonlinear Programming. IMA Volumes in Mathematics and its Applications. 154: 93-115(2011).

International Energy Agency. (2012). IEA Refinery Margins. Paris.

Ji, X., et al., "Integrated Operational and Financial Hedging for Risk Management in Crnde Oil Procurement", Industrial & Engineering Chemistry Research, 54(37): 9191-9201 (2015).

Jones, D. R., Schonlau, M., & Welch, W. J. (Jun. 30, 1998). Efficient Global Optimization of Expensive Black-Box Functions. Journal of Global Optimization, 13, 455-492.

Kallestrnp, KB., et al., "Decision support in hierarchical planning systems: The case of procurement planning in oil refining industries", Decision Support Systems; 68:49-63 (2014).

Kroese, Dirk P., et al., "Handbook of Monte Carlo Methods" Wiley Series in Probability and Statistics (2011). https://books.google.com/books?id=Trj9HQ7G8TUC&printsec=frontcover#v=onepage&q&f=false.

Nelsen, Roger, B., "An Introduction to Copulas" Springer Series in Statistics 2nd Edition (2006). https://books.google.com/books?id=yexFAAAAQBAJ&printsec=frontcover#v=onepage&q&f=false.

Oddsdottir, T.A., et al., "Procurement planning in oil refining industries considering blending operations"; Computers & Chemical Engineering; 58:1-13 (2013).

Racine, J.S., "Nonparametric Econometrics: A Primer, vol. 3"; Foundations and Trends in Econometrics (2008).

Support Vector Machines. Retrieved from scikit-learn: Oct. 10, 2019 https://scikit-learn.org/stable/modules/svm.html#svm.

Varvarezos, D.K., "Optimal Solution-Range Analysis in Production Planning: Refinery Feedstock Selection" Industrial & Engineering Chemistry Research, 47:8282-8285 (2008).

Yang, Yu, et al., "Integrated Crnde Selection and Refinery Optimization Under Uncertainty", AIChE Journal, 62 (4), 1038-1053 (2015).

Zhang, J., et al. "Simultaneous Optimization of Crnde Oil Blending and Purchase Planning with Delivery Uncertainty Consideration", Industrial & Engineering Chemistry Research, 51(25):8453-8464 (2012).

International Search Report and Written Opinion of the International Searching Authority for International Application No. PCT/US2017/024463, titled: Robust Feedstock Selection System for the Chemical Process Industries Under Market and Operational Uncertainty, dated: May 19, 2017, 13 pages.

International Preliminary Report on Patentability for International Application No. PCT/US2017/024463, titled: Robust Feedstock Selection System for the Chemical Process Industries Under Market and Operational Uncertainty, dated: Nov. 1, 2018, 6 pages.

Notice of Transmittal and International Search Report and Written Opinion of the International Searching Authority for International Application No. PCT/US2021/017062, titled: Automated Evaluation of Refinery and Petrochemical Feedstocks Using a Combination of Historical Market Prices, Machine Learning, and Algebraic Planning Model Information, dated: Mar. 30, 2021, 14 pages.

International Preliminary Reporton Patentability received for PCT Patent Application No. PCT/US2021/017062, dated Nov. 3, 2022, 9 pages.

\* cited by examiner

AUTOMATED EVALUATION OF REFINERY AND PETROCHEMICAL FEEDSTOCKS USING A COMBINATION OF HISTORICAL MARKET PRICES, MACHINE LEARNING, AND ALGEBRAIC PLANNING MODEL INFORMATION

BACKGROUND

Process plants/complexes, such as oil refineries or petrochemical complexes, follow operating plans with the goal of maximizing efficiency and economic profit. Operating plans are developed in order to determine the feedstock (such a types of crude) purchases and product sales as well as various process conditions. One of the most important decisions in generating the optimal plan is related to the selection of the process complexes' feedstock. While most refineries have long-term contracts for crude purchases, they also perform spot-evaluations of crudes to take advantage of varying market conditions. Optimal crude feedstock selection, along with the generation of the optimal operating plan, is a rigorous process in refinery supply chains and involves the use of mathematical programming tools. Determining the optimal crude feedstock selection requires knowledge of how the specific refinery operates and is fundamentally a refinery planning decision. However, decisions related to spot purchases of crudes are typically made by traders who are not necessarily trained in refinery planning. Traders must make these spot decisions quickly to utilize the fluctuating market conditions.

Petroleum refineries perform crude evaluations by assessing their profitability against their process unit configuration. Each refinery plant can have a different set of process units and therefore it possesses different abilities in terms of processing different types of crudes and producing a different mix of products. These inherent characteristics of the refinery determine the selection of crudes, the production profile, and affect overall economic profitability. In terms of feedstocks, refineries evaluate and purchase crude oil using contracts (for long term commitments) as well as spot purchases (short term decisions) as described in U.S. Published application Ser. No. 15/133,701. Since a large range of crude feedstocks with different properties like sulfur content, specific gravity etc. are available in the marketplace and their prices fluctuate every day, these evaluations need to be performed on a regular (daily, weekly, or monthly) basis for all spot purchases decisions. Rigorous assessment of the profitability of a crude is done by calculating a metric called the crude indifference value (CIV) or breakeven value (BEV) using an optimization procedure that solves a large algebraic model using mathematical optimization algorithms. These algorithms are embedded in process complex planning models such as PIMS (by Assignee Aspen Technology, Inc.), and involve the simultaneous solution of linear and non-linear equations involving both continuous and discrete variables.

Crude feedstock valuation assesses the marginal value, for a given process complex, of a candidate crude feedstock expressed in $/Bbl (dollars per barrel) over its corresponding market price (so that positive values indicate a profitable purchase opportunity). In order to calculate the breakeven value for a given refinery or process complex, refinery planners traditionally set up two cases of a planning problem to be solved by the process complex planning model—a base case and a valuation case. The base case consists of only the base crude basket (a set of crude feedstocks that represent base operations for the target refiners). The valuation case introduces a fixed quantity of the crude to be evaluated (in the context of base operations). Although breakeven value calculations based on historical market conditions may have been used to provide general indications of crude feedstock profitability for a given refinery, existing methods require rigorous calculations based on the current market conditions and these calculations require setting up and execution of multiple planning scenarios of the base and valuation cases. The current method creates several specific challenges. For example, one specific challenge is that spot crude purchase decisions are typically made by traders who lack knowledge of target refinery operations and do not have the expertise needed to set up the planning scenarios and execute them. Another specific challenge is that since the trading decisions must be quick, frequently traders do not have the time to consult planners with more experience and/or knowledge, regarding their decision. A large part of these trading decisions is guided by the traders' experience which might preclude a segment of potentially profitable crudes from being included in the evaluation process.

SUMMARY

Embodiments of the present invention provide a novel technology that accurately predicts the profitability of a candidate crude oil (or any petrochemical feedstock such as naphtha, ethane, propane, butane mixes, etc.) for a given refinery (or petrochemical plant) based on current market conditions without the need of a rigorous (and time consuming) optimization algorithm execution.

A method of determining a target feedstock for a process complex comprising receiving a dataset comprised of market condition. Preprocessing data in the received dataset based upon properties of a given process complex. Training predictive models, using machine learning and the preprocessed data, each model configured to calculate a breakeven value of a candidate feedstock for the given process complex under an individual market conditions, different predictive models optimized for different market conditions. Selecting a trained model based on based upon existing market condition. Executing the selected trained model and determining if the candidate feedstock is a target feedstock for the given process complex under the existing market condition.

The received dataset may comprise break even values of the candidate feedstock from the given process complex under market conditions. These break even values of the candidate feedstock may be calculated using a planning model for the given process complex. The dataset may comprise a crack spread of the given process complex. The market conditions may include prices of feedstocks and pries of products.

The properties of the given process complex may include at least one of outputs of a process complex planning module, an average composition of feedstocks, an average composition of product sales, a crack spread, and profit margins.

Preprocessing the data may include classifying data in the dataset using a classification algorithm. Preprocessing the data may also include reducing dimensions of data in the dataset using a reduction algorithm. Preprocessing the data may also include clustering the data in the dataset using a clustering algorithm.

A method of determing a target feedstock for a process complex comprising determining, for a given process complex, breakeven values for a candidate feedstock under market conditions using a computer executed process complex planning module for the given process complex, the market condition comprising of feedstock prices and product prices.

The method further includes generating a set of vectors, wherein each vector comprises: (i) the determined breakeven value for the candidate feedstock under an individual market condition, (ii) the feedstock prices of the individual market condition, (iii) the product prices of the individual market condition.

The method further includes determining multipliers for the feedstock prices and product prices of the set of vectors and applying the determined multipliers and adjusting the feedstock prices and the product prices of the vectors by the determined multipliers. The method includes transforming a subset of vectors onto a reduced dimensional space. The method includes, for each subset of vectors training, using a machine learning algorithm, models configured to calculate a breakeven value of the candidate feedstock for the given process complex. The method includes selecting a trained model based on a target market condition and executing the selected trained model and determining if the candidate feedstock is a target feedstock for the given process complex under the target market condition.

In the method, determining multipliers for feedstock prices and product prices may be based upon at least one of the crack spread, average product sales fraction, average feedstock optimal input fraction, and configuration of the target process complex. Determining multipliers for the feedstock prices and product prices may be based on an optimal planning solution determined by the process complex planning module.

Dividing the set of vectors into subsets may be performed by a supervised machine learning algorithm. The supervised machine learning algorithm may be a support vector machine.

Transforming the subset of vectors onto a reduced dimensional space may be performed by an unsupervised machine learning algorithm. The unsupervised machine learning algorithm may be a principal component analysis.

The method may further comprise generating vector clusters from the transformed subset of vectors and for each vector cluster training, using the machine learning algorithm, a model configured to calculate the breakeven value of the candidate feedstock for the given process complex. In such embodiments, generating vector clusters may be performed by a K-means clustering algorithm.

The machine learning algorithm may be an anisotropic kriging algorithm.

The prices of feedstocks and the prices of products of the market conditions may be historical prices of feedstocks and prices of products.

The method may further comprise adding (a) the breakeven value of the candidate feedstock under the target market condition, (b) product prices of the target market condition, and (c) feedstock prices of the target market condition, as a new vector of the set of vectors.

Each vector utilized in the method may further comprise iv) a custom crack spread of the given process complex calculated by the process complex planning module and v) a standard crack spread.

BRIEF DESCRIPTION OF THE DRAWINGS

The patent or application file contains at least one drawing executed in color. Copies of this patent or patent application publication with color drawings will be provided by the Office upon request and payment of the necessary fee.

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

DETAILED DESCRIPTION

A description of example embodiments follows. The teachings of all patents, published applications and references cited herein are incorporated by reference in their entirety.

Embodiments of the current invention may utilize predictive models created by a combination of supervised and unsupervised machine learning (ML) algorithms that predict the break even value (BEV) of an available candidate feedstock (crude oil, naphtha, ethane, etc.) for a given process complex (oil refineries or other petrochemical complexes). The predictive models use a training dataset comprised of data generated through the optimization of a large number of refinery planning scenarios. The planning scenarios may be constructed upon publicly available historical market conditions and may be used to determine the BEV of the candidate feedstock for the given refinery under those market conditions. The planning scenarios may be generated and executed using commercial planning optimization tools, such as PIMS (by Assignee Aspen Technology, Inc.). The generated training dataset may consist of feedstock and product prices, crack spreads, and the BEV of the candidate feedstock for the given refinery. Before being used as the input for machine learning (ML) algorithms, the training dataset may be preprocessed to reflect knowledge of the given process complex properties such as an average composition of feedstocks, an average composition of product sales, a crack spread, and profit margins.

In order to improve the accuracy of the predictive models, embodiments of the invention may partition the training dataset into subsets representing dissimilar market conditions. The training dataset may be accolated into subsets using any combination of Support Vector Machines (SVM) for classification, Principal Component Analysis (PCA) for dimension reduction, and k-means clustering. Subsequently, a supervised ML regression algorithm (for example kriging) is used to train a predictive model, for each subset, that predicts the BEV of a candidate feedstock for a set of input market conditions. In order to predict the BEV of a candidate feedstock under current market conditions, the model that was trained using the training data subset that most accurately represents the current market conditions is used. Support Vector Machines (SVM), Principal Component Analysis (PCA), and k-means clustering may be used to help determine which trained model is the most appropriate to use. The supervised and unsupervised ML algorithms employed in embodiments are further described below. Furthermore, it should be clear to one skilled in the art that the functions described below may be accomplished by all applicable machine learning (ML) algorithms and not just the algorithms explicitly described herein.

Figure 1:
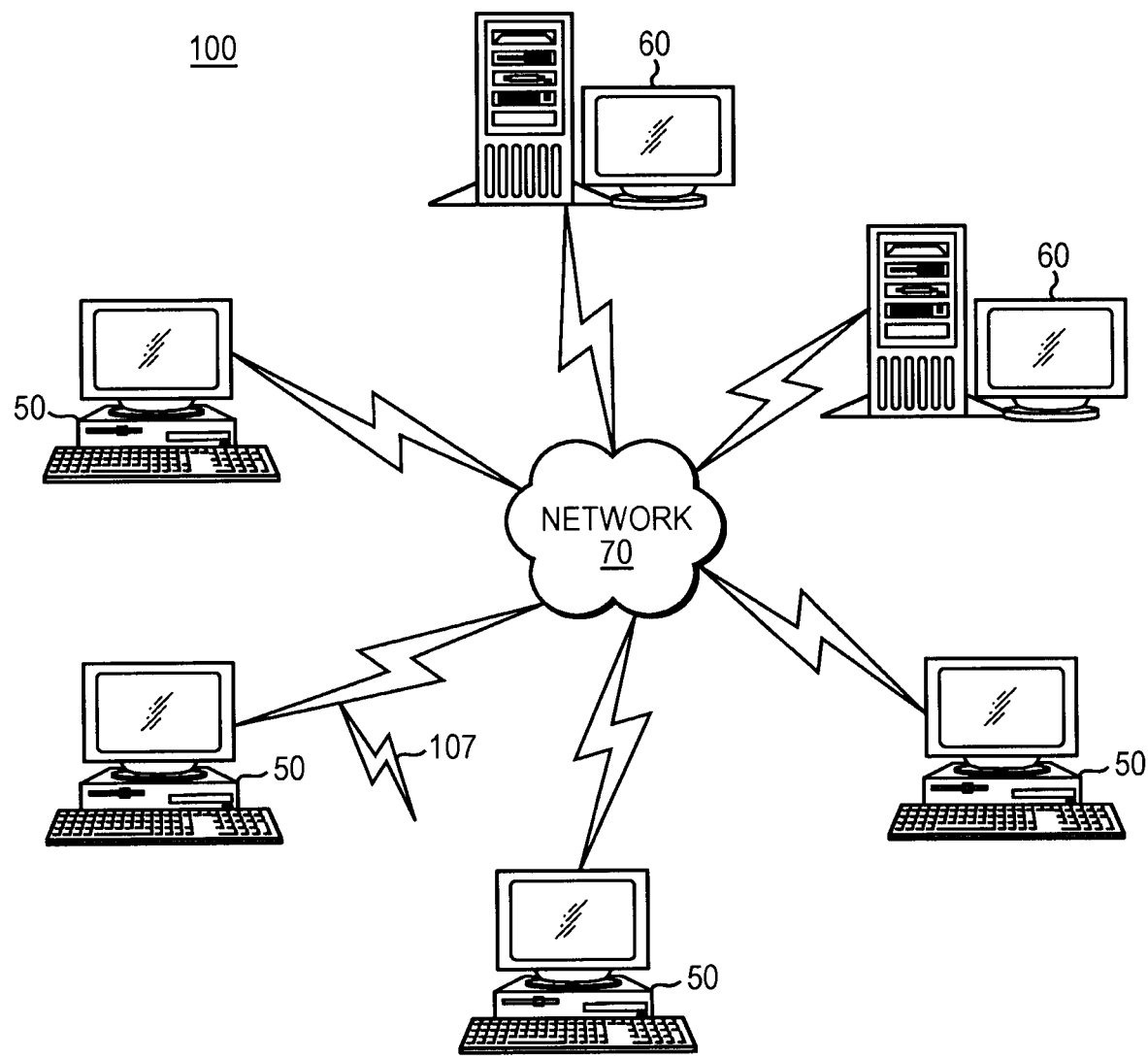
FIG. 1 illustrates a computer network or similar digital processing environment in which the present invention may be implemented.

Example implementations of a computing system and associated method determining a target feedstock for a process complex may be implemented in a software, firmware, or hardware environment. FIG. 1 illustrates a computer network or similar digital processing environment in which embodiments (e.g., system 100) of the present invention may be implemented.

Client computer(s)/devices 50 and server computer(s) 60 provide processing, storage, and input/output devices executing application programs and the like. Client computer(s)/devices 50 can also be linked through communications network 70 to other computing devices, including other client devices/processes 50 and server computer(s) 60. Communications network 70 can be part of a remote access network, a global network (e.g., the Internet), cloud computing servers or service, a worldwide collection of computers, Local area or Wide area networks, and gateways that currently use respective protocols (TCP/IP, Bluetooth, etc.) to communicate with one another. Other electronic device/computer network architectures are suitable.

Client computers/devices 50 and server computer(s) 60 may execute any of the computation steps or processes of embodiments of the invention including training a predictive model using machine learning, preprocessing data, receiving a dataset, selecting a trained model, and executing a trained model. Client computers/devices 50 and server computer(s) 60 may store any of the data utilized in the steps or processes of embodiments including a dataset comprised of market conditions both before and after preprocessing, trained models, process complex information and properties (e.g. crack spread), and learning machine kernels.

Figure 2:
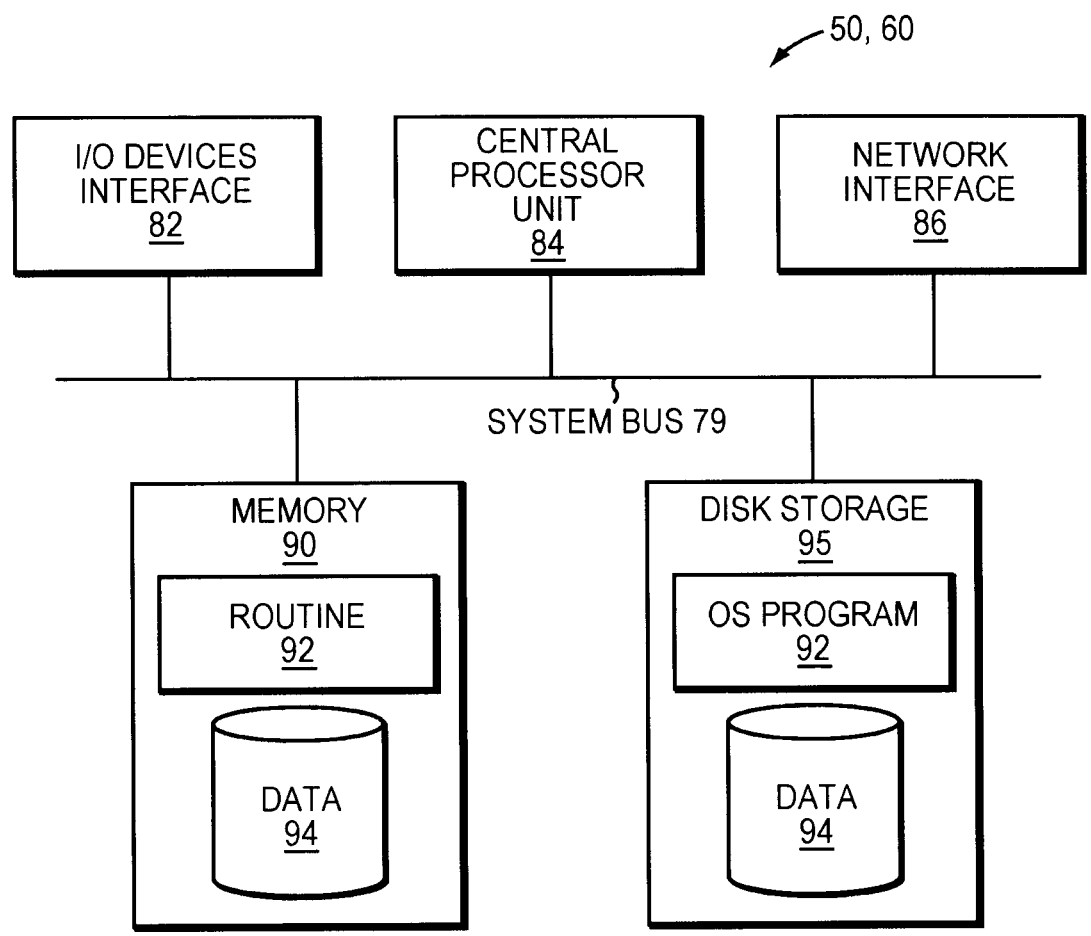
FIG. 2 is a diagram of the internal structure of a computer (e.g., client processor/device or server computers) in the computer network of FIG. 1.

FIG. 2 is a diagram of the internal structure of a computer (e.g., client processor/device 50 or server computers 60) in the computer system of FIG. 1. Each computer 50, 60 contains system bus 79, where a bus is a set of hardware lines used for data transfer among the components of a computer or processing system. Bus 79 is essentially a shared conduit that connects different elements of a computer system (e.g., processor, disk storage, memory, input/output ports, network ports, etc.) that enables the transfer of information between the elements. Attached to system bus 79 is I/O device interface 82 for connecting various input and output devices (e.g., keyboard, mouse, displays, printers, speakers, etc.) to the computer 50, 60. Network interface 86 allows the computer 50, 60 to connect to various other devices attached to a network (e.g., network 70 of FIG. 1). Memory 90 provides volatile storage for computer software instructions 92 and data 94 used to implement an embodiment 100 of the present invention (e.g., training data module 311, preprocessor 312, classifier module 313, predictor module 315; data representations of market conditions, and breakeven values; vector sets, machine learning algorithms, process complex planning modules, support vector machines, principal component analysis programs/routines, clustering algorithms, and anisotropic kriging algorithms; method 500 of FIG. 5; etc.). Disk storage 95 provides non-volatile storage for computer software instructions 92 and data 94 used to implement an embodiment of the present invention. Central processor unit 84 is also attached to system bus 79 and provides for the execution of computer instructions.

In one embodiment, the processor routines 92 and data 94 are a computer program product (generally referenced 92), including a computer readable medium (e.g., a removable storage medium such as one or more DVD-ROM's, CD-ROM's, diskettes, tapes, etc.) that provides at least a portion of the software instructions for the invention system. Computer program product 92 can be installed by any suitable software installation procedure, as is well known in the art. In another embodiment, at least a portion of the software instructions may also be downloaded over a cable, communication and/or wireless connection. In other embodiments, the invention programs are a computer program propagated signal product 107 embodied on a propagated signal on a propagation medium (e.g., a radio wave, an infrared wave, a laser wave, a sound wave, or an electrical wave propagated over a global network such as the Internet, or other network(s)). Such carrier medium or signals provide at least a portion of the software instructions for the present invention routines/program 92.

In alternate embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer readable medium of computer program product 92 is a propagation medium that the computer system 50 may receive and read, such as by receiving the propagation medium and identifying a propagated signal embodied in the propagation medium, as described above for computer program propagated signal product.

Generally speaking, the term "carrier medium" or transient carrier encompasses the foregoing transient signals, propagated signals, propagated medium, storage medium and the like. In other embodiments, the program product 92 may be implemented as a so-called Software as a Service (SaaS), or other installation or communication supporting end-users.

This invention provides a novel and unique way to calculate the expected profitability of a candidate feedstock (commonly crude oil refineries or gas and naphtha feeds for petrochemical units) for a given process complex under inputted (user selectable) market conditions based on publicly available price information for feedstocks and derivative products (gasoline, kerosene, diesel, fuel oil, asphalt, etc). Embodiments of the invention can be compared to existing tools or methodologies used for calculating the profitability of a candidate feedstock with respect to a base feedstock basket from a supply chain planning perspective. The prior art methods can be divided into two broad categories: those that use statistical methods to train a predictive model and those that employ rigorous optimization of the planning model to calculate the BEV of a candidate feedstock by generating and solving complete planning scenarios. The present invention is unique since it provides a novel combination of both approaches. Although the invention fundamentally uses machine learning and predictive models, the training dataset can be augmented with very specific information obtained from rigorous optimization of planning models and scenarios as well as empirically derived measures such as crack-spreads.

In system 100, a training data module 311 (FIG. 3) generates a training dataset by executing planning scenarios for a set of price records. For each price record, to calculate the BEV of a candidate feedstock for a given complex, the training data module 311 creates and executes scenarios as "cases" in PIMS, a planning solution software by assignee Aspen Technology Inc. After the BEV calculations are complete, the training data module 311 constructs the training dataset. The training dataset comprises a set of data points corresponding to each price record. In a given price record, each data point i has coordinates: (a) feedstock and product prices in the x-space as independent variables, and (b) the calculated candidate feedstock BEV in the y-space as a dependent variable.

In some embodiments, the training data module 311 or preprocessor 312 adjusts data points' independent variables, such as feedstock and product prices, by weights based upon their average activity values in the given process complex. The activity values provide estimates of the relative importance of the different independent variables, thus creating a hybrid methodology that uses price record data and refinery planning models as well as the underlying domain expertise.

Besides the feedstock and product prices, the x-space of the data points of the training dataset set may additionally include the crack spread measures or other variables that represent the given process complex properties. Crack spreads indicate the profit margin of oil refineries. Data preprocessor 312 may use approximate values based on average yield values for typical refineries from a geographical region. For example, the 3:2:1 (benchmark crude: gasoline: diesel) crack spread gives the approximate margin for a typical U.S. refinery. Embodiments of the invention are capable of including several crack spread calculations for various geographical regions as well as a more accurate custom crack spread calculation based on optimal yield values obtained from the planning solutions.

The machine learning portion of the approach uses a combination of unsupervised and supervised algorithms to obtain candidate feed stock BEV predictions with improved accuracy. First, a classifier module 313 receives as input the training dataset constructed and output by the training data module 311 and preprocessed by the pre-processor 312. The classifier module 313 divides the training dataset into classes based on candidate feed stock BEV. Next, the classifier module 313 uses the class-arranged training data set to train a classification algorithm to sort data points into the classes. The classifier module 313 may use at least one class of the training dataset to subsequently to train a principle component analysis (PCA) algorithm. Additionally, the least one class of the training dataset may be further partitioned into multiple clusters. Then a predictor module 315 creates and trains separate predictive models using each final subdivision (classes and/or clusters) of the training dataset to account for the variation in influence of an independent variable on the dependent variable based on position in the space of the training dataset. The predictor module 315 runs (executes) the predictive models and therefrom forecasts a candidate feedstocks BEV for a given process complex under inputted price conditions. The predictive models output forecasted candidate feedstocks BEV results that can then be used to determine if a candidate feedstock is a target feedstock for the given process complex.

Figure 3:
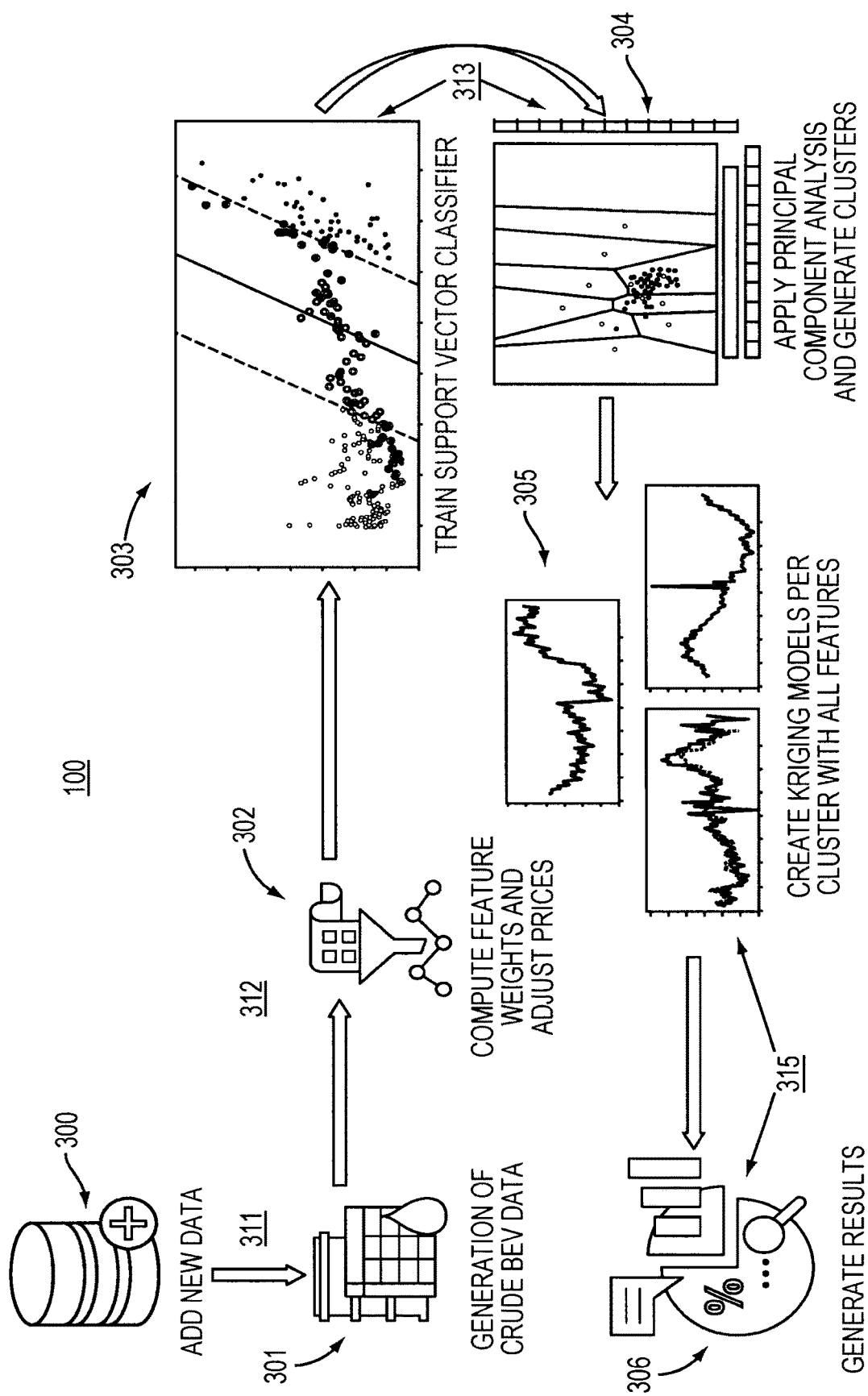
FIG. 3 is a workflow diagram illustrating the steps of an example embodiment.

FIG. 3 is a workflow diagram illustrating the steps of an example embodiment system 100. The example embodiment shown in FIG. 3 includes seven steps 300, 301, 302, 303, 304, 305, 306 or modules 311, 312, 313, 315, each consisting of different data management components and/or machine learning technologies. These modules are used to form a decision-making support framework that is used to predict the profitability of a candidate feedstock for a given process complex. The following is a brief explanation of each step of the workflow outlined in FIG. 3. Each step and the modules completing those steps are described further below. Furthermore, embodiments of the invention are not limited to the entire workflow shown in FIG. 3 and certain embodiments may include a range of combinations of the data management components and/or machine learning technologies discussed both in FIG. 3 and the later sections of this disclosure.

In the first step 300, new price data is received. This price data can be drawn from historical market conditions and records with known feedstock prices and product prices. In step 301, a training dataset is generated (e.g., by training data module 311). Each data point of the training dataset includes: (i) independent variables comprising historical feedstock and product prices, and (ii) a dependent variable comprising the calculated breakeven value (BEV) of a candidate feedstock for a given refinery under those historical market conditions. In some embodiments, the independent variables may also include features of the given process complex such as crack spreads.

In step 302, the independent variables, such as feedstock and product prices, of the data points in the training dataset are adjusted by feature weights (e.g., by preprocessor 312). Feature weights may be determined using refinery planning scenarios and solutions for the given refinery. Therefore, the training dataset can be adjusted to better represent features of the given refinery.

In step 303, the training dataset is split into classes and used to train a support vector classifier (e.g., by classifier module 313). The trained support vector classifier is trained to predict the class of data point composed of inputted market conditions.

In step 304, principle component analysis is used to reduce the dimensions of at least one class of the training dataset (e.g., by classifier module 313). Clustering (e.g., by classifier module 313) is also used to further subdivide at least one class of the training dataset.

In step 305, for each final subdivision of the training dataset (classes and/or clusters), a kriging model is created and trained (e.g., by predictor module 315). The kriging model is configured to predict the dependent variable, target feedstock breakeven value, based upon, for example, user inputted independent variables, product and feedstock prices, and process complex features.

Finally, in step 306 (e.g. by predictor module 315), the kriging model that was trained on the final subdivision of the training dataset whose independent variables most resemble the inputted market conditions, is used to generate a prediction of the breakeven value of a candidate feedstock for the given refinery.

Generation of a Training Dataset

A training data module 311 generates a training dataset from a set of price records that will be used to train machine learning algorithms and create predictive models. For each price record the module sets up some two refinery planning scenarios, a base case and a breakeven case, for a refinery planning model (e.g. PIMS model) with a fixed base crude basket. Normally the price records consist of historical feedstock and product prices that are publicly available. However, a custom price information dataset can also be used as the inputted price records. The base crude basket is determined by the base case of the planning model for the given refinery. Training data module 311 executes the planning scenarios using PIMS, or equivalent refinery planning model software. The training data module 311 reads an output database to collect the feedstock activities, product activities, and objective function values for each case. The objective function values of a base case and its corresponding breakeven case are used to calculate the BEV of the candidate feedstock for any price record i, as shown in Equation 1A below. The number of base and breakeven cases for an evaluated candidate feedstock is equal to the number of price records in the dataset.

$$BEV_i = \frac{obj_{BEV,i} - obj_{base,i}}{activity_{BEV}}; \forall\, i \in [0, i_{max}] \quad \text{Equation 1A}$$

The output of training data module 311 is included in a training dataset which is used as an input for the subsequent steps of the method and modules of system 100. The training dataset is comprised of data points for each price record, each data point having independent (x) and dependent (y) variables. The x-variables include feedstock and product prices. The dataset has one (y) dependent variable, the candidate feedstock's candidate BEV. The training data module 311 generates one training dataset for each candidate feedstock to be evaluated, and system 100 processes each training dataset separately.

In one embodiment, the training data module 311 may be implemented in C# programming language and uses SQL to retrieve data from historical cases (typically from the PIMS output database).

Preprocessing the Training Dataset

Once the training dataset has been generated, in some embodiments, a preprocessor 312 preprocesses the dataset to better represent a given process complex. One way of preprocessing the dataset is to adjust the feedstock and product prices comprising the x-variables of the training dataset based on refinery planning scenarios and solutions for the given process complex. These planning solutions can be generated and executed by a refinery planning model such as PIMS. In one embodiment, preprocessor 312 adjusts each feedstock price by a feature weight that corresponds to the average fraction that feedstock constitutes in the optimal feedstock slate of the planning solutions. Therefore, price of the feedstock that makes up the bulk of the feedstock in the planning solution on an average has a higher weight compared to a feedstock that makes up only a small fraction of the feedstock. The product prices are adjusted by a feature weight that corresponds to the product sale fractions of the given refinery. All prices can be nondimensionalized by using Equation 1B for all features i multiplied by their respective PIMS weight $\chi_i$. Similarly, the preprocessor 312 may adjust the crack spreads by dividing them by the benchmark crude price.

$$\text{new } price_i = \chi_i \cdot \frac{\text{original } price_i - \text{crude evaluated price}}{\text{crude evaluated price}}; \forall\, i \in C \quad \text{Equation 1B}$$

A good measure of the refinery profit margin is the crack spread. The crack spread considers feedstock and product prices as well as product yields from a process complex and standard crack spread measures are used to estimate the expected profit margin of a process complex. Various template crack spreads are available based on refinery configurations, region and crude slate (International Energy Agency, 2012). In some embodiments, the preprocessor 312 may augment the x-variables of the training dataset with the following crack spreads: NW Europe Brent and Ural crude, Mediterranean Es Sider and Ural crude, Singapore Dubai and Tapis crude, US Gulf Coast 50/50 HLS, Mars, and ASCI crudes, and finally US Midcontinent WTI, 30/70 WCS/Bakken, and Bakken crudes. Crack spreads are available for a range of refinery configurations including a simple hydroskimmer configuration, as well as additional refinery configurations that include hydrocracking, fluidized catalytic cracking, visbreaking, and coking units.

In embodiments, the preprocessor 312 may add to the x-space of the training dataset. A new custom "crack variable" based on the planning solutions for the given refinery may also be added. The custom crack variable corresponds to the profit margin of the given process complex based on the optimal planning solutions determined by PIMS. By determining the average PIMS volume yield from template refineries, these margins are used to determine a 'custom crack' spread. Both the template and custom crack spreads can be used to adjust the feedstock and product prices of the training dataset to better tailor the training dataset to the given process complex.

After the training dataset has been generated and adjusted, it can be used by the classifier module 313 to train a range of learning machines that are used, in combination, to forecast results for a candidate feedstock.

Support Vector Classifier

The classifier module 313 trains a support vector machine (SVM) using the training dataset to classify data points as either "LOW", "MEDIUM" and "HIGH". These classifications are profitability-based and are understood by utilizing the corresponding valuations (HIGH=profitable, MEDIUM=marginal, LOW=unprofitable). In other embodiments alternative classifications can be chosen.

Support vector machines (SVM) are supervised machine learning algorithms used for sample classification. Support vector machines create a maximum-margin hyperplane that maximizes data separation—that is, one that maximizes the distance between the plane and known cluster labels. The closest points to the hyperplane lie on a support vector, and the margin between the support vector and the hyperplane is maximized. If the data is not linearly separable, it is projected to higher dimensions and separated appropriately (scikit-learn developers, n.d.). Support vector classification (SVC) is the subsequent classification that follows support vector machine separation. The scikit-learn package from Python is one tool that can be used to create a SVC.

In some embodiments of the invention, a z-score class label ("LOW", "MEDIUM", "HIGH") is added to the data points of the training dataset based on the independent variable of the candidate feedstocks calculated BEV. Table 1 shows the ranges of z-scores for the different BEV based classes. Alternatively, any number of classes may be chosen based upon any desired ranges of z-scores.

TABLE 1

BEV classification labels.

| Class Label | z-score |
|---|---|
| HIGH | $z \geq 1$ |
| MEDIUM | $-1 \leq z \leq 1$ |
| LOW | $z \leq -1$ |

Table 1. BEV classification labels.
Class Label z-score
HIGH $z \geq 1$
MEDIUM $-1 \leq z \leq 1$
LOW $z \leq -1$ By partitioning the data of the training set in this way each class can be considered separately for building and applying predictive models which prevents day-to-day BEV fluctuations from impacting overall model performance. Support vector machines are trained, using the training dataset with added class labels, to identify the class of a data point consisting of inputted market conditions. After the class is determined and output by the classifier module 313, the predictor module 315 selects a predictive model that has been trained using data points of the training dataset that share that class. This correlation improves the accuracy and reliability of the predictive model's output.

Figure 4:
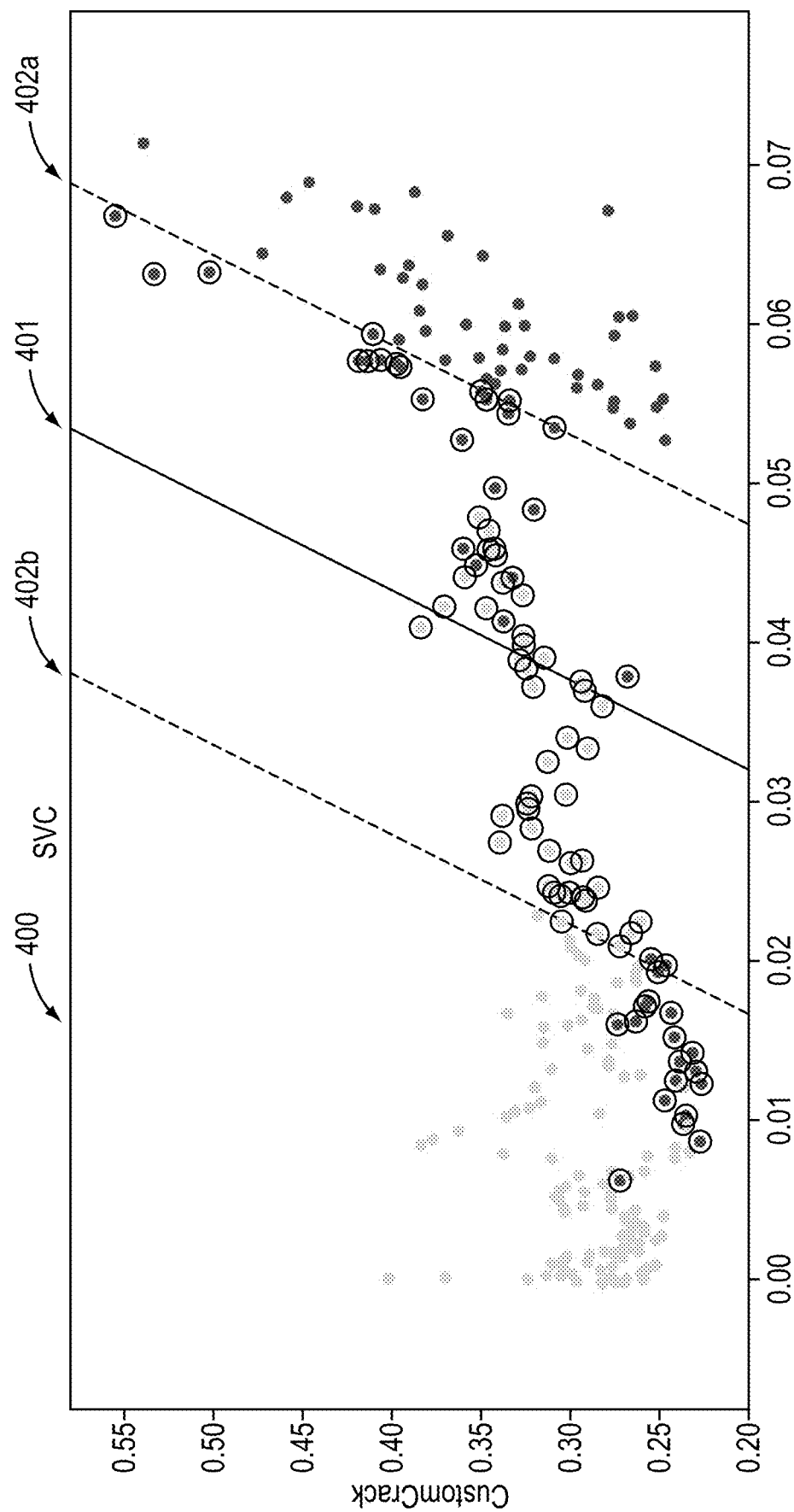
FIG. 4 is a graph of the results of a support vector classification performed on a dataset used in an embodiment of the invention.

FIG. 4 is a graph 400 of the results of an example support vector classification performed on a dataset used in an example embodiment of the invention. For the purposes of visualization, the dataset used to create graph 400 was two dimensional and consisted of data points with a first variable of Azeri Light crude price (shown on the x axis) and a second variable custom crack spread (shown on the y axis). However, in embodiments of the invention the dataset used to train support vector machines may be highly multidimensional and include variables that capture over 60 features of a target feedstock, market conditions, and target refinery properties.

The data of FIG. 4 was partitioned into two classes represented by the colors blue and brown. A hyperplane 401 was created at attempts to separate the data points of the two classes, brown and blue. Hyperplane 401 was chosen to maximize distance from support vectors 402*b* and 402*a*. Support vector 402*b* is supposed to represent the closest blue data point to hyperplane 401 and support vector 402*a* is supposed to represent the closest brown data point to hyperplane 401. However, the dataset used in FIG. 4 could not be fully separated by a linear hyperplane. As shown in FIG. 4, the circled data points are closer to hyperplane 401 than their respective support vectors. Therefore, for the dataset shown in FIG. 4, higher dimension data points are required to fully train a support vector machine.

Principle Component Analysis

The classifier module 313 may use Principal Component Analysis (PCA) to project the data points of the training dataset onto a reduced dimensional space which benefits and simplifies later calculations. Principal Component Analysis (PCA), an unsupervised machine learning algorithm, is an applied linear algebra technique that helps extract useful information from a dataset. Principal Component Analysis is also used as a dimension reduction technique and it can help reveal important dynamics about a dataset. The technique identifies components-combinations of variables of the data points of a dataset—that explain the greatest variance in the dataset with the different components being orthogonal to each other. The classifier module 313 may use the scikit-learn Python package to construct a PCA model.

The classifier module 313 applies the PCA model (algorithm) to the training data set. Applying the PCA algorithm to a dataset, identifies the relative contributions of data point independent variables to the variance of the dependent variables in the dataset. In turn, the classifier module 313 selects principle components from independent variables that have the highest contribution to the dataset variance. The number of principle components can be determined based on the minimum number of principle components required to obtain a cumulative variance cutoff value. In some embodiments, a cumulative variance cutoff value of 0.95 is used. After the principle components are selected, by classifier module 313, the dataset can be reduced to a set of data points whose independent variables include only the principle components. Since the training dataset are composed of data with independent variables of feedstock prices and product prices, identifying which of these variables/features are principle components provides insight regarding the effect of specific market conditions on a candidate feedstock's BEV.

In embodiments of the invention, the classifier module 313 may use Principal Component Analysis to project one or more of the training dataset's classes, defined in Support Vector Machine training, onto a reduced dimensional space. The PCA algorithm can serve as an important preparatory step before clustering. Reducing the dimensions of the training dataset minimizes the impact of Euclidean distance calculations for higher dimensions. Projecting the training dataset (or subset) that will be used as the input for a clustering algorithm onto its principal components, requires the clustering algorithm to identify structure in a lower dimensional space compared with a nonreduced training dataset. While PCA can be applied on any fraction or subset of the training dataset, it has been observed that PCA, and subsequently clustering, provides the most benefit for the "MEDIUM" BEV dataset.

Clustering

In some embodiments, the training dataset can be split into components using clustering (at step 304 by classifier module 313). Clustering can be performed on the entire training dataset or on a previously existing subset of the dataset such as one of the classes defined during the Support Vector Machine training. Clustering can also be performed on an unaltered or preprocessed training dataset or alternatively, can be applied to a training dataset (or subset) that has been dimensionally reduced by Principal Component Analysis or subjected to any other data processing method or algorithm disclosed herein. Classifier module 313 may accomplish the clustering by using an amalgamation of a superset of unsupervised machine learning algorithms designed to represent and group data based on inherent structures in the training data and specialized domain knowledge.

One algorithm that classifier module 313 can use is the K-Means clustering algorithm. K-Means is a centroid-based technique that aims to minimize inertia, or the cumulative Euclidean distances of individual points from cluster centers, as given by Equation 1 (scikit-learn developers, n.d.). µ represents the cluster centroid positions for all clusters j∈C while $x_i$ represents the individual points for all points i ∈ n. The number of cluster centroids is determined from the inertia plot using the elbow method—which finds the number of clusters that yields diminishing inertia loss by calculating the largest second derivative.

$$\sum_{i=0}^{n} \min_{\mu_j \in C} \|x_i - \mu_j\|^2 \qquad \text{Equation 1}$$

Create Predictive Models.

After the classifier module 313 applies clustering and/or any other desired methods and/or algorithms to the training dataset, the predictor module 315 responsively fits a correlation between the input-output data. To accomplish such fitting, the predictor module 314 can use or apply an anisotropic kriging model. The output data is the breakeven value of the candidate feedstock for the given refinery or other desired metric representing viability and the input data is comprised of x-space variables of the dataset that represent market conditions such as feedstock and product prices and process complex information. While a specific Kriging algorithm is discussed below, other equivalent methods for creating predictive models are suitable.

Kriging was developed as a geostatistical method to describe the distribution of mineral deposits, it is now considered as a benchmark in reduced-order modeling. Kriging is based on modeling the predicted variable with a stochastic process. It is assumed that the error in predictions are not independent, but that the errors at two points in the input space are correlated based on the distance between the points. This assumption holds when the points in question are close together Jones, D. R., Schonlau, M. & Welch, W. J. Efficient Global Optimization of Expensive Black-Box Functions. Journal of Global Optimization 13, 455-492 (1998).

Kriging is used in embodiments of the current invention based on the idea that the candidate feedstock's BEV, as a function of feedstock and product prices, is a result of PIMS calculations and is noise-free. The BEV is continuous, implying that the errors at different points should not be independent, but rather correlated based on distance. Equation 2 shows the weighted distance formula used to denote the correlation between errors at two points in Applicant's work.

$$d(x^{(i)}, x^{(j)}) = \sum_{h=1}^{k} \theta_h |x_h^{(i)} - x_h^{(j)}|^{p_h} \theta_h \geq 0 \qquad \text{Equation 2}$$

d represents the distance between any two points $x_i$ and $x_j$. It is equal to the magnitude of the distance between the two points over all features h∈k. Equation 3 expresses how the errors at two points $x_i$ and $x_j$ is related to the distance between them.

$$\text{Corr}[\epsilon(x^i), \epsilon(x^{(j)})] = \exp[-d(x^{(i)}, x^{(j)})] \qquad \text{Equation 3}$$

The prediction for any point $\hat{y}$ is given in Equations 4-8. The mean prediction $\hat{\mu}$ is defined in Equation 6 and the standard deviation is given in Equation 7. Equations 5 and 8 define the prediction correlation vector and the correlation matrix respectively.

$$\hat{y}(x^*) = \hat{\mu} + r' R^{-1}(y - \hat{\mu}), \hat{y} \in R^{n \cdot 1} \qquad \text{Equation 4}$$

$$r_i(x^*) \equiv \text{Corr}[\epsilon(x^*), \epsilon(x^{(i)})], \hat{r} \in R^{n \cdot 1} \qquad \text{Equation 5}$$

$$\hat{\mu} = \frac{R^{-1} y}{R^{-1}}, \hat{\mu} \in R^{n \cdot 1} \qquad \text{Equation 6}$$

$$\hat{\sigma}^2 = \frac{(y - \hat{\mu})' R^{-1} (y - \hat{\mu})}{n}, \hat{\sigma} \in R^{n \cdot 1} \qquad \text{Equation 7}$$

$$R_{i,j} = \text{Corr}[\epsilon(x^i), \epsilon(x^{(j)})], R \in R^{n \cdot n} \qquad \text{Equation 8}$$

The exact fit is obtained by maximizing the likelihood function, as defined in Equation 9. Implicitly:

$$\max_{h} \{\theta_h, p_h\} = \frac{1}{(2\pi)^{\frac{n}{2}} (\sigma^2)^{\frac{n}{2}} |R|^{0.5}} \exp\left[-\frac{(y-\mu)' R^{-1} (y-\mu)}{2\sigma^2}\right] \qquad \text{Equation 9}$$

Equation 9 solely depends on $\theta_h$ and $p_h$ for all h. It should be noted that for this work, $p_h = 2$ (also known as the radial or squared exponential kernel) for all h. The Gaussian Process Regressor from the Python scikit-learn library may be used to fit the model.

In some embodiments, individual kriging models are created for each cluster of the 'MEDIUM' BEV training dataset and for the 'HIGH' and 'LOW' BEV training dataset classes separately. A fixed noise value is applied to the covariance matrix to help construct a useful gaussian distribution prior to forming the kriging models. The kernel hyperparameters for all predictive models are saved so that they can be used in subsequent runs when more data is added.

Forecast Results

The previous steps produce several predictive models that can be used to quickly and efficiently predict the break even value for a candidate feedstock at a given refinery under a set of inputted conditions. These predictive models incorporate the benefit of both the rigorous algorithmic calculations of refinery planning models and personalized knowledge of the specific given refinery without the long processing/set up times required by prior art methods.

The inputted conditions normally represent the current market condition. However, for the predictive models to produce the best results, the input for the predictive models must be processed in a similar manner to the training dataset. The inputted conditions include the feedstock prices and product prices, collectively "Prediction Prices", under which a user wants to predict a candidate feedstock break even value. The feedstock prices and product prices of the inputted conditions are adjusted in the same manner that the independent variables of the training dataset were adjusted. The trained support vector machine is used to predict in which class a data point composed of inputted conditions belongs. If the predicted class was split into clusters, the clustering algorithm is also used to predict in which cluster a data point composed of inputted conditions belongs. Finally, depending on the class and/or cluster to which the inputted conditions were predicted to belong, the corresponding trained kriging model is used to predict the break even value for the candidate feedstock at a given refinery under those inputted conditions.

Add New Data

Any new data can be added (at step 300) to an existing training dataset and processed via steps 301-304 of FIG. 3. New data can consist of the inputted conditions and the predicated break even value forecasted by the selected predictive model. The kernel hyperparameters that are created, in step 305, from the existing training dataset are saved may be used to initialize the kernel on subsequent training sessions. Both of these self-reinforcing actions allow for the predictive ability of the method to improve in subsequent runs as earlier data is incorporated into the predictive models and learning machine training.

Figure 5:
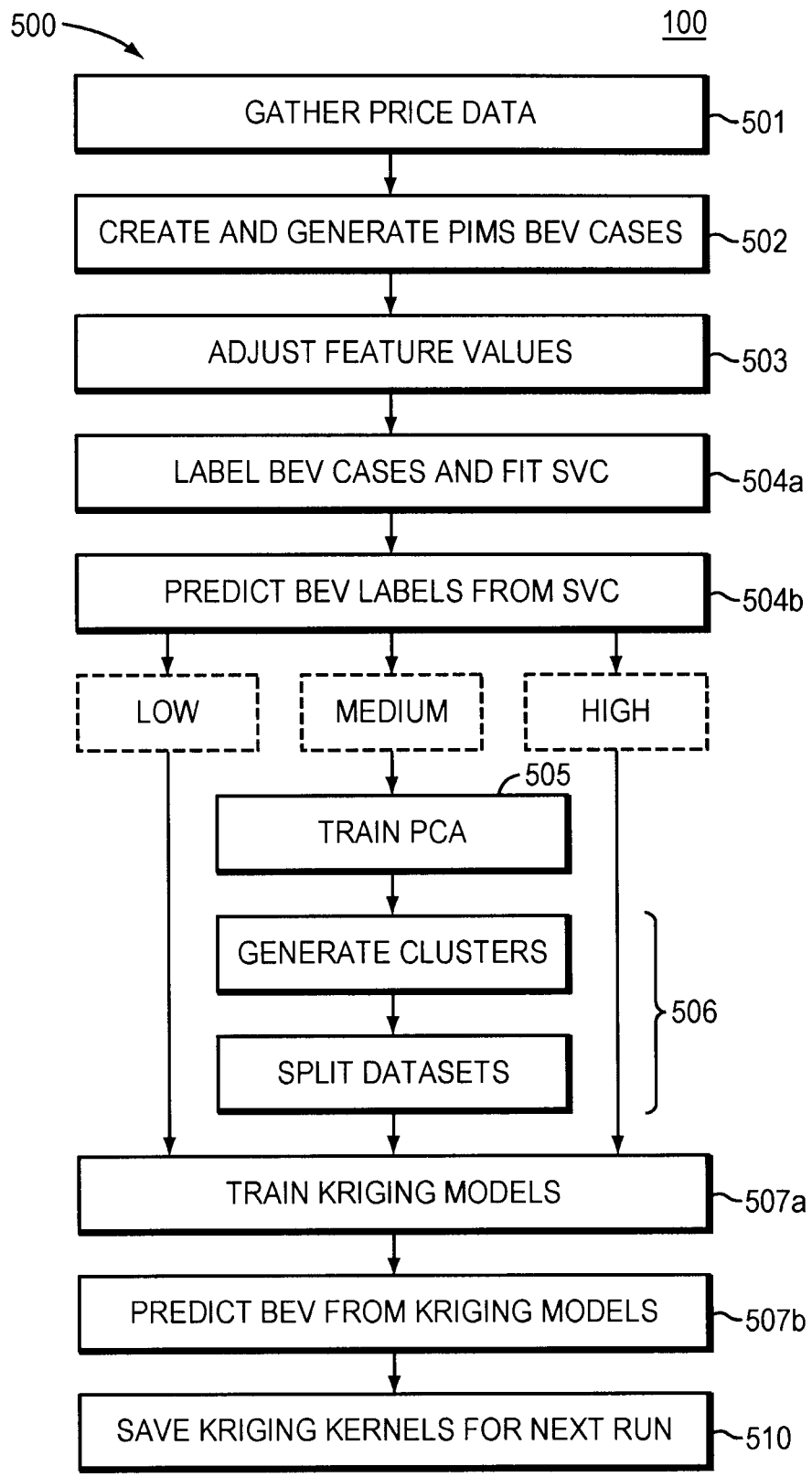
FIG. 5 is a flow chart of the steps for training predictive models with a training dataset and applying the trained predictive models to a validation dataset in the embodiment of FIGS. 1-3.

FIG. 5 is a flow chart of the steps for using a training dataset to train predictive models and applying the training predictive models to a validation dataset in an example embodiment of system 100. While FIG. 5 illustrates a workflow for a validation dataset drawn from existing price records, the same workflow can be utilized for entering inputted price conditions to predict the break even value of a candidate feedstock under those conditions.

In step 501, system 100 gathers price records consisting of features such as feedstock and product prices. The gathered price data comprise the independent variables for both the training and validation datasets. In step 502, for each price record, system 100 uses PIMS (of assignee Aspen Technology, Inc.) or the like and generates pertinent planning scenarios. When the planning scenarios are executed they provide planning solutions that calculate the breakeven value for a candidate feedstock at a given refinery. The calculated breakeven values comprise the dependent variables for the training and validation datasets. For the validation dataset, these break even values are used only as comparables for the predicted break even values produced at the end of the processes.

In step 503, system 100 preprocesses and adjusts features/variables in the x-space of both the training and validation datasets. Features such as feedstock and product prices can be adjusted based on the executed planning solutions for the given refinery. The planning solutions provide the average feedstock usage and product sales fractions for the given refinery. Step 503 adjusts the independent variables of the training and validation datasets based on weights that correlates to the dataset's use and sales fraction. Step 503 can also adjust the feature values based on additional information such as the given process complexes crack spread. The crack spread can be a template crack spread based on general information, for example location or refinery configuration, or the crack spread can be a custom crack spread determined by refinery planning software known in the art.

After the first three steps 501, 502, and 503, the workflow for the validation and training datasets diverge. The training dataset is used to train a set of machine learning modules and create predictive models. The validation dataset is used as the input for the trained modules/models and is used to validate the predictive models by comparing their output to the break even values calculated in step 502.

In step 504a, system 100 splits the training dataset into classes. The example embodiment illustrated in FIG. 5 splits the training dataset into three classes Low, Medium, and High based on the break even values comprising the dependent variable. After step 504a labels the training dataset by class, step 504a uses the labeled training dataset to train a support vector machine that creates a support vector classifier (SVC). The support vector classifier predicts which class a data point belongs to, based upon its independent variables. After the support vector classifier (SVC) is created, step 504b uses the SVC to predict which class label, Low, Medium, or High the data points of the validation dataset belong to.

In step 505, system 100 uses the training dataset to train a principle component analysis (PCA) algorithm or program routine. The trained principle component analysis algorithm/program routine is used to project the training and validation datasets onto a reduced dimensional space which only include independent variables that are principle components. While step 505 can be performed on all three classes of the training dataset, in the embodiment illustrated in FIG. 5 system 100 applies step 505 only to the Medium class of both datasets.

In step 506, system 100 uses a k-means clustering algorithm to generate clusters from the training dataset and to split both the training and validation datasets into those clusters. Clustering can be performed on datasets in various forms, such as, reduced dimensional datasets or nonreduced datasets. While step 506 can be performed on any subset of either the training dataset or the validation dataset, in the embodiment illustrated in FIG. 5 system 100 performs step 506 only to the reduced dimension Medium class of both datasets. In other words, step 506 generates clusters from the reduced dimension Medium class of the training dataset and splits the Medium class training dataset and the Medium class validation dataset into the generated clusters.

In step 507a, system 100 trains separate kriging predictive models using respective classes and clusters of the training dataset. In step 507b, system 100 uses the trained kriging models to predict the dependent variable, and the candidate feedstock's break even value, based on the inputted independent variables (i.e., feedstock prices and product prices) of the data points in the validation dataset. For each data point in the validation dataset, depending on the cluster and/or class it was predicted to belong to in steps 504b and 506, system 100/step 507b uses the kriging model that was trained on the corresponding cluster and/or class of the training dataset.

Finally, in step 510, system 100 saves the kriging kernels of the predictive models so that the kriging kernels can be used in subsequent sessions.

Figure 6:
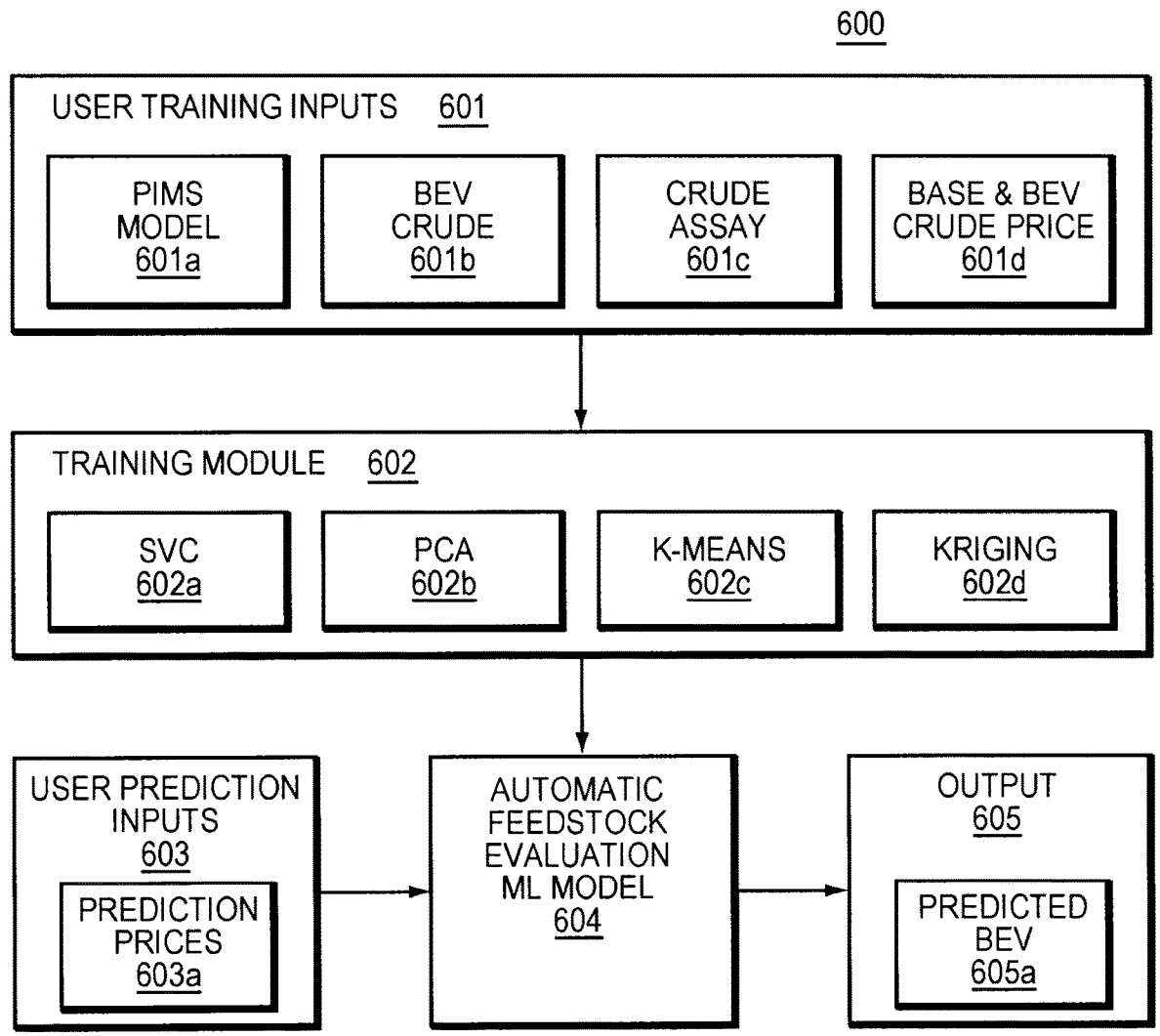
FIG. 6. is a block diagram of an example system embodying the present invention and illustrating prediction of a candidate feedstock's break even value for automated spot crude decision making.

FIG. 6. is a block diagram of an embodiment system 600. FIG. 6 illustrates how data is introduced to the system 600 and how the system 600 predicts a candidate feedstock's break even value. There are two sets of user inputs 1) the user training inputs 601 that the training module 602 uses to create the automatic feed stock evaluation model 604, and 2) the prediction inputs 603 that are used as inputs for the automatic feed stock evaluation model 604.

The user training inputs 601 include the refinery planning "PIMS" model 601a, the identity of the candidate feedstock 601b, a crude assay 601c of the candidate feedstock, and the prices of the base feedstocks of the given process complex (refinery) and candidate feedstock 601d.

Using these inputs, training module 602 creates the automatic feed stock evaluation model 604 using the methods described herein (e.g., in FIGS. 3 and 5). Specifically, in some embodiments, training module 602 uses support vector machines to train a support vector classifier (SVC) 602a, a principle components analysis algorithm 602b, a K-means clustering algorithm 602c, and kriging models 602d to create a set of predictive models (at 604). Training module 602 trains each predictive model using a subdivision of a training dataset (of 601) composed of historical price records and a calculated break even value for the chosen candidate feedstock. Collectively, the trained learning machine algorithms and the predictive models make up the automatic feed stock evaluation model 604.

To use the automatic feed stock evaluation model 604, a user provides prediction inputs 603, which include the prices of feedstocks and products 603a for which the user wants to determine the candidate feedstocks break even value. The inputted prediction prices of feedstocks and products 603a are treated as a set of independent variables and processed using the methods described herein. Specifically, in some embodiments, the independent variables are first adjusted based on refinery planning solutions for the given refinery. Then, using the trained support vector classifier 602a, principle component analysis 602b, and/or clustering algorithm 602c, system 600 assigns to the prediction prices 603a a class and/or a cluster. In turn, the automatic feed stock evaluation model 604 selects a trained predictive model based on the prediction prices' assigned class and/or cluster. Finally, the automatic feed stock evaluation model 604 executes the selected predictive model using the user input prediction prices 603a and produces output 605.

Output 605 includes the predicated break even value 605a for the candidate feedstock 601b for the given refinery under inputted prediction prices 603a. Depending on the value of output 605a, it can be determined if the candidate feedstock 601b is a target feedstock for the given refinery. This determination can be accomplished either with manual monitoring or automatic analysis of output 605. In turn, an output indication of the candidate feedstock 601b being a target feedstock (i.e., the predicted break even value 605a meeting a threshold value) enables a trader to quickly and accurately make spot crude purchase decisions for the given refinery or subject process complex/plant. In this way, system 600 provides automated decision guidance overcoming the challenges (i.e., time consuming optimization algorithms, and lack of incorporated planner knowledge/experience) presented in the art of crude oil valuation.

As an example, a user may be a trader in the crude oil market. In particular, the trader is conducting spot evaluation of crude feedstock for a specific refinery. To efficiently and economically, according to operating plans of the refinery, perform the spot evaluation, the trader employs a computer tool such as system 100, 600. The computer tool 100, 600 may be implemented as an executable software application of a laptop 50, mobile device 50, and the like. The software may be cloud-based or otherwise supported by a server 60 over a global network (the Internet) 70, so as to be readily available to the trader via his device 50. To initiate a session on the computer tool 100, 600, the trader inputs data of a candidate feedstock including identity, crude assay, and price records. The computer tool 100, 600 also uses as input PIMS (by assignee Aspen Technology, Inc.) planning models of the specific refinery and price records of the base feedstock and products of the refinery. In turn, computer tool 100, 600 generates an automatic feedstock evaluation model 604 specific to the trader's and refinery's current circumstances. Next the trader inputs prediction prices of feedstocks and products at which the user desires to know the break even value of the candidate feedstock. Computer tool 100, 600 responsively and quickly computes and models the break even value (BEV) of the candidate feedstock for the given scenario of the refinery. Computer tool 100, 600 efficiently outputs an indication of the candidate feedstock BEV, or an indication of the computed BEV meeting a threshold, or the like. The indication may be in the form of an approval notice or decision instruction communication to spot purchase the candidate feedstock. The indication may be in signal form automatically communicating to a purchasing application interface, and the like. Other forms of indication and output are within the purview of one skilled in the art. In this way, embodiments of the present invention (computer tool 100, 600) are efficient and effective in producing spot evaluations of crude feedstock and provide advantages over the state of the art.

Case Study

The results of the methods disclosed herein in a case study considering a typical Gulf Coast refinery are presented below. The Gulf Coast model available with PIMS (by assignee Aspen Technology, Inc.) installation was used as the refinery planning model. The base case of that model was modified to include (although not limited to) 11 reference crudes: Amenam, Amna, Azeri Light, Brass Light, Cabinda, Ekofisk, Rabi Blend, Arab Light, Dalia, Hibernia, and Zafiro. These crudes and their associated benchmarks are detailed in Table 2.

TABLE 2

Listing of base basket crudes and their benchmark crudes.

| Crudes | Benchmarks |
|---|---|
| Amenam | Brent |
| Amna | Brent |
| Arab Light | Dubai |
| Azeri Light | Brent |
| Brass Light | Brent |
| Cabinda | Brent |
| Dalia | Brent |
| Ekofisk | Brent |
| Hibernia | West Texas Intermediate |
| Rabi Blend | Brent |
| Zafiro | Brent |

In the case study, Alaska North Slope crude (ANS) was selected as the candidate feedstock. Price data, used to generate the training and validation datasets, for all the products and the benchmark crudes were obtained from the IEA.gov database. Price records were collected per day from June 2006-December 2018. Prices for the crudes were modeled as logarithmic functions of their respective benchmark crude prices. The total dataset size was 3103 price record samples with a training: validation split of 2868:235. The training dataset included price records from June 2006-December 2017 while the validation dataset included price records from January-December 2018. This separation of the validation data was to ensure that no data points used to make a prediction were included in the training dataset.

The training dataset was divided into the classes based upon the z-score ranges outlined in Table 1. The training dataset had data point splits of 14%, 70%, and 15% respectively for the 'LOW', 'MEDIUM', and 'HIGH' classes respectively. The split training dataset was used to train a support vector machine to create a support vector classifier (SVC) with a mean accuracy above 0.99 in predicting class identity. This support vector classifier was used to predict the class label of the data points composing the validation dataset. Then the validation dataset was split into classes based on the predicted 'LOW', 'MEDIUM', and 'HIGH' class labels. The optimal results were found when applying k-means clustering to the "MEDIUM" class of the training dataset, that is projected onto the principal components by using principle component analysis (PCA).

Figure 7:
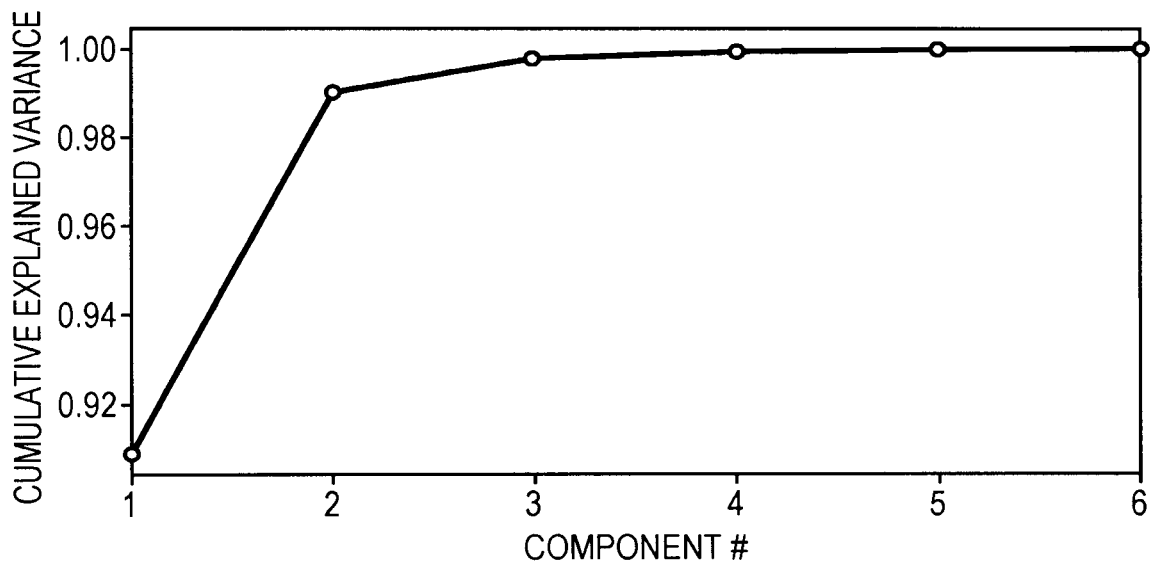
FIG. 7 is a cumulative variance plot for the principal component analysis performed on the training dataset in Applicant's case study.

FIG. 7 is a cumulative variance plot for the principal component analysis (PCA) performed on the training dataset in the case study. The cumulative variance plot shows the relationship between the number of components, combinations of x-space independent variable that include feedstock and product prices, and the cumulative variance of the y-space, dependent variable the candidate feedstock's break even value. The optimal number of principle components was found by calculating the minimum number of components that yield an explained cumulative variance greater than a threshold value. In the case study, a threshold of 0.95 was chosen which is surpassed with two components. Therefore, in the case study, both the "MEDIUM" class of the training dataset and the predicted "MEDIUM" class of the validation dataset are projected onto a reduced dimensional space whose x-space is composed of two principle components.

Figure 8:
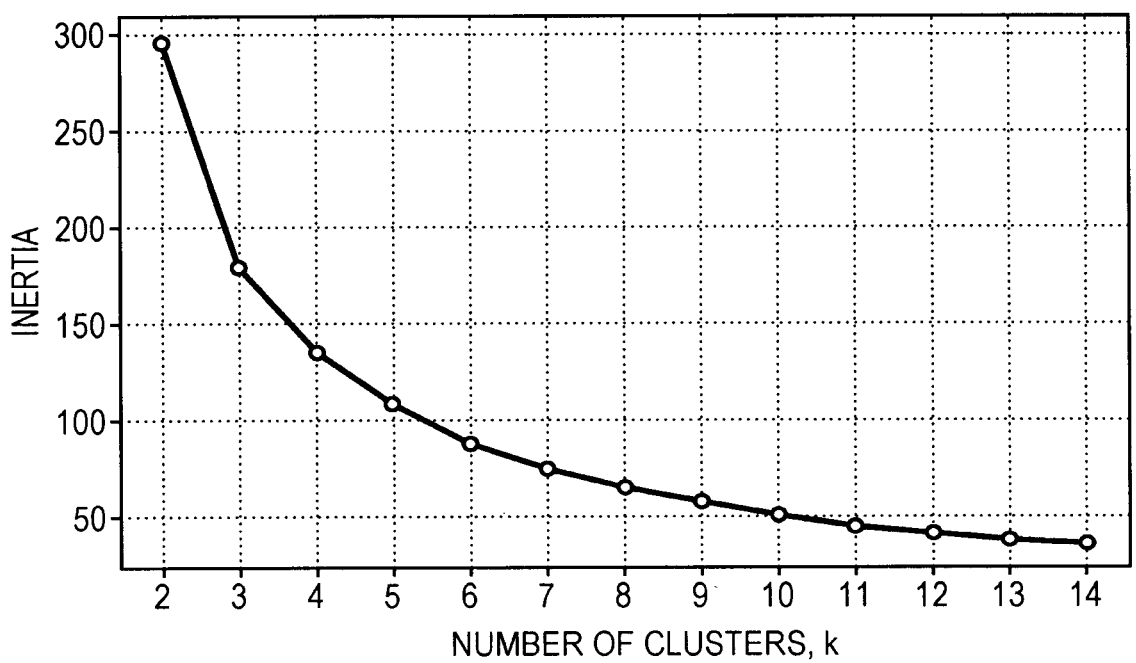
FIG. 8 is an inertial plot for the k-means clustering algorithm as applied to the training dataset in the case study.

FIG. 8 is an inertial plot for the k-means clustering algorithm as applied to the training dataset in the case study. The k-means clustering algorithm was applied to the "MEDIUM" class of the training dataset after it had been projected onto a reduced dimensional space consisting of the two principle components identified by principle component analysis (PCA). The inertial plot illustrates how three clusters were determined to be the optimal subdivision of the "MEDIUM" class of the training dataset. The optimal number of clusters was found by calculating the largest second derivative via the elbow method. As shown in FIG. 8, three clusters produced the second largest derivative.

Figure 9:
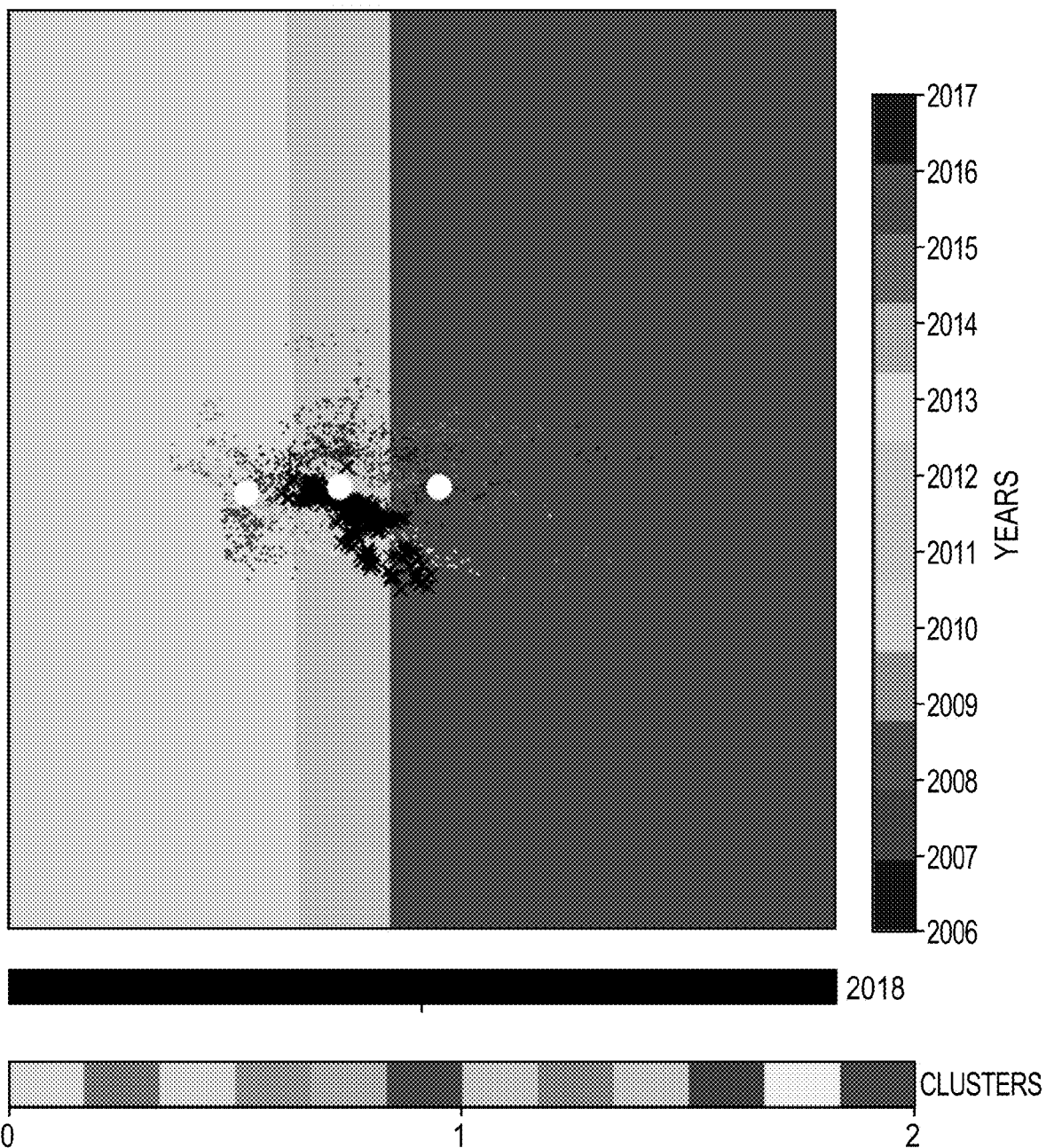
FIG. 9 is a Voronoi diagram displaying the projection of the "MEDIUM" class of the training and validation datasets of the case study onto a reduced dimensional space.

FIG. 9 is a Voronoi diagram displaying the projection of the "MEDIUM" class of the training and validation datasets of the case study onto a reduced dimensional space. The Voronoi diagram displays the validation dataset as black crosses and the training dataset as colored dots in the reduced dimensional space created by principle component analysis (PCA). The Voronoi diagram identifies the three clusters, determined by applying k-means clustering, as different shading tones and the cluster centroids are displayed by white circles. The Voronoi diagram illustrates how the data points in both datasets are distributed amongst the different clusters and shows the validation dataset exists in a similar sample space as the training dataset.

Individual kriging models are trained on the 'HIGH' class, the 'LOW' class, and the three clusters of data derived from the 'MEDIUM' class of the training dataset. The range of kernel length scale values are found to be between [1e-5, 1e8], corresponding to θ values between [1e-16,1e8]. The features with the largest θ are the prices of Amenam crude, Azeri light crude, low sulfur fuel oil, LPG, and light straight run while the features with the smallest θ are the prices of gasoline, coke, NW Ural crack spread, and Tapis crack spread.

Figure 10:
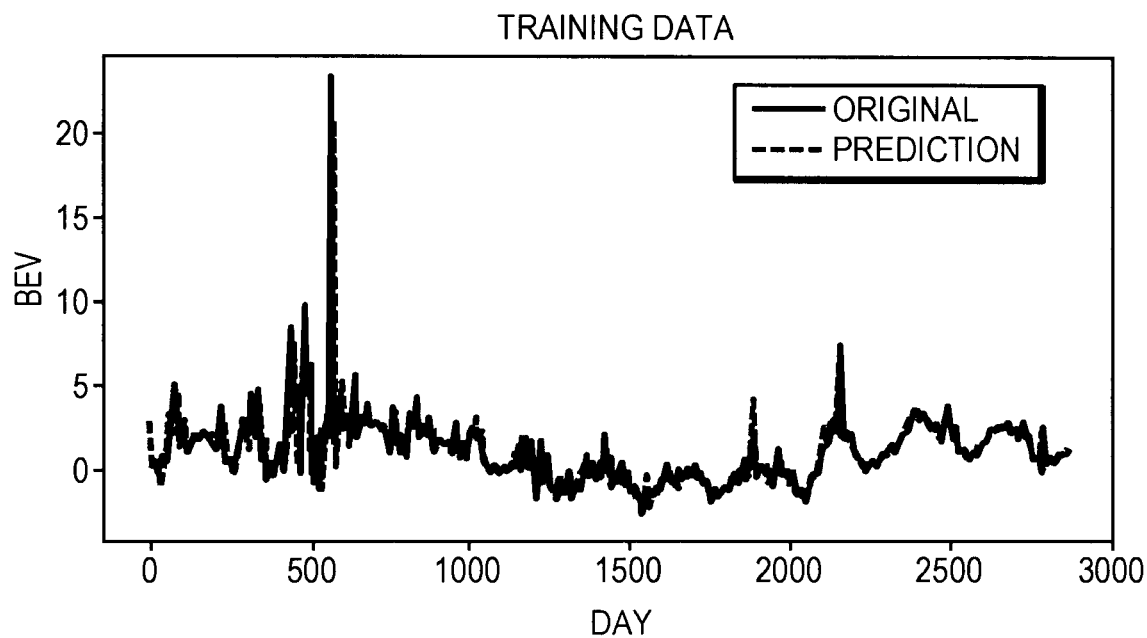
FIG. 10 is a comparison plot of the original values vs. the predicted values of the candidate feedstock's break even value for the data points in the training dataset of the case study.
Figure 11:
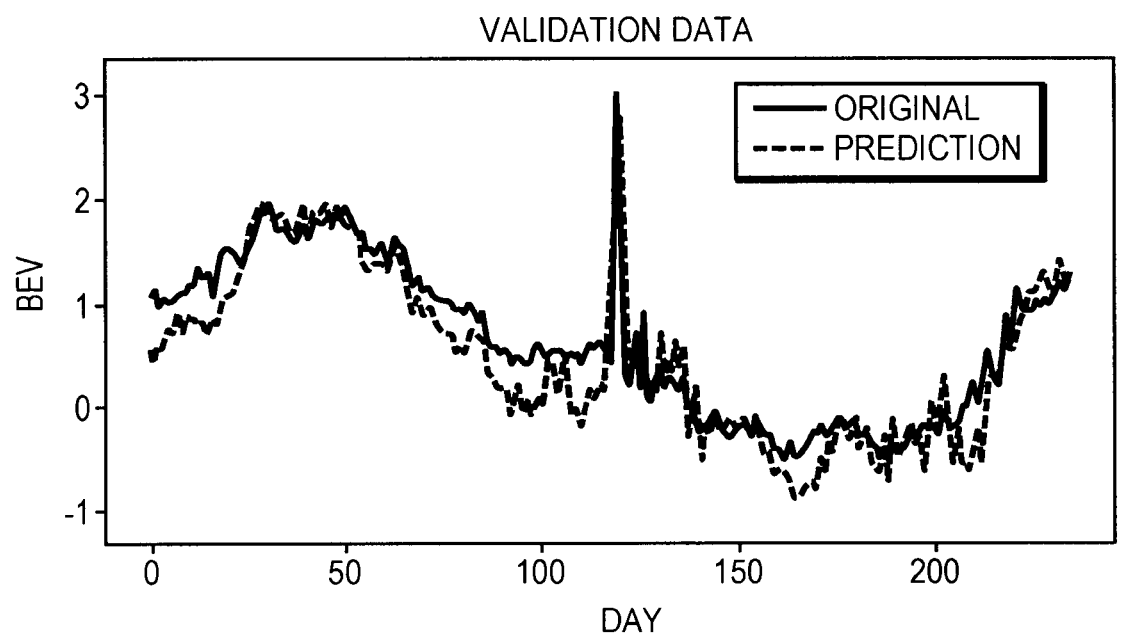
FIG. 11 is a comparison plot of the original values vs. the predicted values of the candidate feedstock's break even value for the data points in the validation training dataset of the case study.

Once the optimal length scales are found for the five kernels trained by the five final subdivisions of the training dataset, the corresponding training kriging kernel is used to predict the candidate feedstock's break even value for each data point of the validation and training dataset. The break even value predictions are then compared against their actual known values to determine effectiveness. The results are shown in FIGS. 10 and 11. The case study used a training $R^2$ value of 0.988 with a root-mean-squared error (RMSE) of 0.191 and a validation $R^2$ value of 0.904 with an RMSE of 0.287. A training time of roughly 25 minutes was observed.

FIG. 10 is a plot of the original values versus the predicted values of the candidate feedstock's break even value of the data points comprising the training dataset in the case study. In FIG. 10, the x axis is the time landscape (in days) of the data points of the training dataset, and the y-axis is the candidate feedstock's break even value. The mean break even value prediction is given by the solid red line while the standard deviation returned by the kriging model's kernel is given as the light red adjoining the mean value. The actual break even value is given by the solid black line. Since the training dataset was used to train the kriging models used to predict the break even values, it follows that the original values and predicted values displayed in FIG. 10 are highly correlated.

FIG. 11 is a plot of the original values versus the predicted values of the candidate feedstock's break even value of the of the data points comprising the validation training dataset in the case study. In FIG. 11, the x axis is the time landscape (in days) of the data points of the validation dataset, and the y-axis is the candidate feedstock's break even value. The mean break even value prediction is given by the solid red line while the standard deviation returned by the kriging model's kernel is given as the light red adjoining the mean value. The actual break even value is given by the solid black line. Despite the fact the validation data points were not used to train the kriging models used to predict the break even values, the actual feedstock's break even value primarily fall within a standard deviation of the predicted value. This remains true even during periods of extreme volatility.

While example embodiments have been particularly shown and described, it will be understood by those skilled in the art that various changes in form and details may be made therein without departing from the scope of the embodiments encompassed by the appended claims.

What is claimed is:

1. A computer implemented method of determining a target feedstock for a process complex, the method comprising:
   receiving a dataset comprised of market conditions;
   preprocessing data in the received dataset based upon properties of a given process complex, the receiving and preprocessing being performed by one or more digital processors;
   creating a training dataset, wherein each data point of the training dataset includes: (a) independent variables representing the preprocessed data, and (b) a dependent variable comprising a breakeven value of a candidate feedstock for the given process complex, the breakeven values being calculated by using the preprocessed data;
   altering the independent variables of the created training dataset by respective weights that tailor the training dataset to represent features of the given process complex, the respective weights being automatically determined based on feedstock input and product output of the given process complex;
   training, using the created training dataset resulting from the altering, a classification learning machine to sort the data points of the created training dataset into classes that are based upon the breakeven values of the candidate feedstock for the given process complex;
   clustering data points of one or more classes of the data points defined in the training of the classification learning machine, said clustering using a clustering algorithm that minimizes the distance of points of training data subsets from cluster centers, different resulting training data subsets of the created training dataset reflecting the properties of the given process complex under different market conditions, the creating, altering, training, and clustering being automatically performed by the one or more digital processors;
   training plural predictive models, before occurrence of an existing market condition, using a point interpolation machine learning regression and the resulting training data subsets to fit a correlation between the market conditions represented by the independent variables of the data points of the created training dataset and the breakeven values of the candidate feedstock, fitting the correlation being based upon a relationship between: (i) distance between a pair of data points, and (ii) errors at said data points in the pair, each predictive model configured to calculate a predicted breakeven value of the candidate feedstock for the given process complex under at least one of the different market conditions, different predictive models being optimized for the different market conditions;

selecting a trained predictive model based upon the existing market condition, said selecting resulting in a selected trained predictive model optimized for the existing market condition;

executing the selected trained predictive model to calculate, using the existing market condition as input, a predicted breakeven value of the candidate feedstock for the given process complex under the existing market condition, the training of predictive models, selecting, and executing the selected trained predictive model being automatically performed by the one or more digital processors; and producing a spot evaluation of the candidate feedstock for the given process complex by: (i) automatically determining whether the candidate feedstock is a target feedstock for the given process complex under the existing market condition, and (ii) using results of said determining, automatically outputting a decision instruction communication with regard to spot purchasing the candidate feedstock for the given process complex, wherein said automatically determining is based on the calculated predicted breakeven value of the candidate feedstock for the given process complex under the existing market condition, and wherein the one or more digital processors selecting, executing the trained predictive model, and producing a spot evaluation in an amount of time that is less than an amount of time that the existing market conditions occur.

2. The method of claim 1 wherein the break even values of the candidate feedstock are calculated using a planning model for the given process complex.

3. The method of claim 1 wherein the dataset further comprises a crack spread of the given process complex.

4. The method of claim 1 wherein the market conditions include prices of feedstocks and prices of products.

5. The method of claim 1 wherein the properties of the given process complex include at least one of outputs of a process complex planning module, an average composition of feedstocks, an average composition of product sales, a crack spread, and profit margins.

6. The method of claim 1 wherein the classification learning machine is configured to classify the data in the training dataset using a support vector machine.

7. The method of claim 1 wherein preprocessing the data includes reducing dimensions of data in the dataset using a reduction algorithm.

* * * * *